United States Patent [19]

Weitman

[11] Patent Number: 4,574,870
[45] Date of Patent: Mar. 11, 1986

[54] METHOD AND APPARATUS FOR CONTROLLING A COUNTER-FLOW HEAT EXCHANGER

[76] Inventor: Jacob Weitman, Tryffelstigen 8, S-611 63 Nykoping, Sweden

[21] Appl. No.: 380,748
[22] PCT Filed: Sep. 11, 1981
[86] PCT No.: PCT/SE81/00256
   § 371 Date: May 12, 1982
   § 102(e) Date: May 12, 1982
[87] PCT Pub. No.: WO82/01063
   PCT Pub. Date: Apr. 1, 1982

[30] Foreign Application Priority Data

Sep. 12, 1980 [SE] Sweden ............................. 8006391

[51] Int. Cl.⁴ .............................................. F28F 27/00
[52] U.S. Cl. ............................................ 165/1; 165/39; 165/40
[58] Field of Search ......................... 165/12, 39, 40, 1

[56] References Cited

U.S. PATENT DOCUMENTS

| | | | |
|---|---|---|---|
| 2,466,525 | 4/1949 | Wilson | 165/40 |
| 3,172,462 | 3/1965 | Brunner | 165/39 |
| 3,213,929 | 10/1965 | Marshall et al. | 165/40 |
| 3,820,590 | 6/1974 | Littman et al. | 165/39 |
| 3,918,300 | 11/1975 | Weisstuck et al. | 374/7 |
| 4,243,871 | 1/1981 | McKenney | 165/40 |
| 4,291,750 | 9/1981 | Clyne et al. | 165/34 |
| 4,381,814 | 5/1983 | Funk | 165/34 |

FOREIGN PATENT DOCUMENTS 2843  1/1981  Japan ..................................... 165/40

OTHER PUBLICATIONS

Kreith, Frank, *Principles of Heat Transfer*, International Textbook Co., Scranton, Pa., 1958, pp. 448–452.

Primary Examiner—Albert W. Davis, Jr.
Attorney, Agent, or Firm—Lewis H. Eslinger

[57] ABSTRACT

A figure of effectiveness of a heat exchanger is maintained at a predetermined level, even when one of the input fluid flows varies in an incontrollable manner, without the need for flow meters to detect any flow variations. Temperature sensors are arranged in the respective input and output fluid lines to measure the temperature of the fluids at these points and differential circuits and a comparator form a temperature relation that is compared to a predetermined, desired temperature relation to drive a servo system to control a flow value in the inlet water line, which results in the desired figure of effectiveness for that heat exchanger without measuring the actual fluid flow.

4 Claims, 3 Drawing Figures

METHOD AND APPARATUS FOR CONTROLLING A COUNTER-FLOW HEAT EXCHANGER

BACKGROUND OF THE INVENTION

The present invention relates to a method and apparatus for controlling the flow of fluids through a heat exchanger in order to maintain the efficiency or effectiveness of the heat exchanger at a predetermined level that is selected with respect to the particular prevailing operational conditions. The inventive method and apparatus eliminate the requirement to use flow meters for measuring either of the two fluid flows through the heat exchanger, even if the flow of one of the fluids varies in an uncontrollable fashion with respect to time.

In many industrial processes there are produced large flows of fluid which have been elevated in temperature, such as heated waste water, and in which the flow of the fluid may exhibit large variations in the flow with respect to time. When the flow rate of the elevated temperature fluid is high, it is attractive to recover as much of the heat content of such fluid as possible by conducting it through a heat exchanger, preferably through a counter-current heat exchanger, and there to transfer the heat to another fluid, making it possible to utilize the heat absorbed in this second fluid. Should the flow rate of one of the fluids vary, then the flow rate of the other fluid also has to be adapted or adjusted correspondingly to keep the thermal transfer in the heat exchanger at or near an optimum value with respect to the particular prevailing operational conditions.

The solution to this problem which seems nearest at hand, and the one that is most commonly used, involves making direct fluid flow rate measurements and controlling the flow of one of the fluids in response to variations in the flow of the second fluid, as well as the other measured parameters. This direct measuring of fluid flow involves technical as well as economic problems in many applications, for example, when confronted with the large magnitudes of variations of fluid flow which may be present when recovering heat from the waste water in an industrial process.

OBJECTS AND SUMMARY OF THE INVENTION

It is an object of the present invention to substantially eliminate the problems mentioned above that are inherent in the prior art.

It is another object of the present invention to provide a method and apparatus for controlling the fluid flow through a heat exchanger in such a fashion that the operation of the heat exchanger is maintained substantially at an optimal level, even when there are large, uncontrolled variations in the flow rate of one of the fluids, and in which the controlling of the flow rate of the second fluid that is being heated is provided without the use of making direct flow measurements.

According to one aspect of the present invention a servo-controlled valve is arranged at the inlet of the second fluid that is being heated, and the valve is controlled in response to the temperatures which are sensed in each of the respective inlet and outlet lines of the two fluids. The temperatures sensed are compared and divided based upon developed temperature relationships, and the valve in the second fluid inlet line is operated accordingly, without any requirement for costly and complicated fluid flow meters.

DETAILED DESCRIPTION OF PREFERRED EMBODIMENTS

Figure 1:
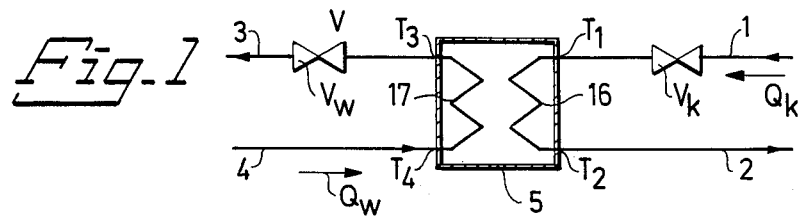
FIG. 1 schematically represents a heat exchanger and indicates the relevant fluid flow parameters and temperatures useful in the present invention.

FIG. 1 shows a heat exchanger 5, which may be a heat exchanger of the kind used to recover heat from large flows of water at elevated temperatures, such as occur in waste water from an industrial process, and which transfers the heat extracted from such waste water to a second flow of water. Heat exchanger 5 has inlet 1 for "cold" water which is to be heated and which flows therein with a flow $Q_k$ through the heat exchanger 5 to outlet 2, and an inlet 4 for "warm" water from which the heat is to be transferred to the cold water and which flows into inlet 4 with flow rate $Q_w$ and ultimately flows out of outlet 3. The temperature at inlet line 1 of the cold water is represented at $T_1$ and the temperature at the outlet of the heat exchanger 5 for the cold water is represented at $T_2$ and, similarly, the temperature at the inlet of the warm water to the heat exchanger 5 is represented at $T_4$ and the temperature at the outlet of the warm water is represented at $T_3$. As may be seen heat exchanger 5 in this embodiment operates in the counter-current mode, which is preferable in this embodiment, but the invention is advantageous for use with all heat exchangers.

Figure 2:
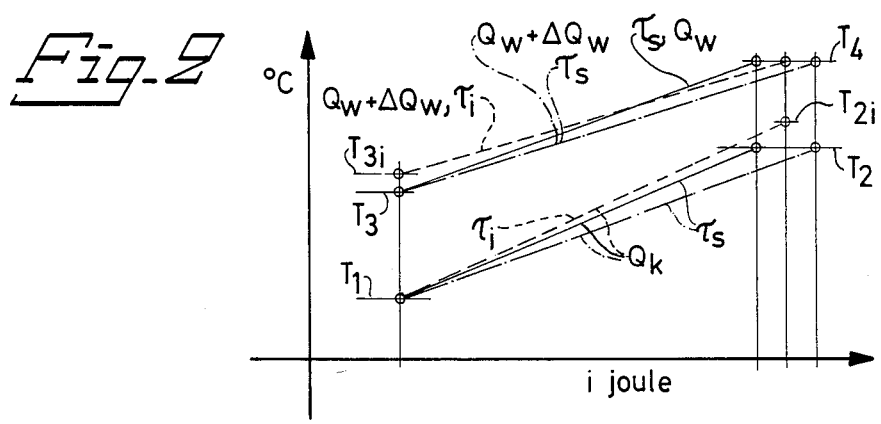
FIG. 2 is a graphical representation of the relationship between the temperature and enthalpy levels of the fluids flowing through the heat exchanger of FIG. 1.

FIG. 2 represents graphically the temperature progression of the two fluid flows and has the ordinate axis representing temperature in degrees Centigrade and the abcissa representing enthalpy in joules. Initially, it is seen in FIG. 2 that the flow of the first or warm fluid $Q_w$ is cooled down from temperature $T_4$ to temperature $T_3$, while the flow $Q_k$ of the second or cold fluid is heated from initial temperature $T_1$ to final temperature $T_2$.

The functional parameter of interest of the heat exchanger is a temperature relationship $\tau_s$ which is to be maintained at a predetermined desired value in order to operate or utilize the heat exchanger optimally. This temperature relationship $\tau_s$ can be written as:

$$\tau_s = \frac{T_4 - T_3}{T_2 - T_1} \quad (1)$$

The present invention involves two basic concepts that are used in determining that this parameter or temperature relationship is the basis for the control of one of the fluid flows in dependence on the size of the other fluid flow so that heat will be transferred from the warmer fluid while maintaining the flow data that the heat exchange within the heat exchanger is maintained in a substantially optimum condition and taking into account the system capacity and other properties of the heat exchanger. One such basic concept is the "temperature efficiency" of the heat exchanger, which is defined as:

$$\eta_T = \frac{T_2 - T_1}{T_4 - T_1} \quad (2)$$

The second parameter or basic concept is the "enthalpy efficiency of the heat exchanger, which is defined as:

$$\eta_e = \frac{T_4 - T_3}{T_4 - T_1} \quad (3)$$

where $T_1$, $T_2$, $T_3$, and $T_4$ are the temperatures described above measured at the corresponding points in heat exchanger 5. Considering the extreme or limiting cases of $\eta_T$ and $\eta_e$, during operation of a particular heat exchanger, for instance, one having a specific flow of hot waste water the heat from which is to be recovered entering the heat exchanger having a temperature $T_4$, the following will be valid with respect to the cold water entering the heat exchanger. If the cold water flow $Q_k$ approaches 0, the temperature $T_2$ thereof when leaving the heat exchanger will approach the inlet temperature $T_4$ of the hot waste water, that is, the "temperature efficiency" will approach the value 1. At the same time, the exit temperature $T_3$ of the waste water approaches its inlet temperature $T_4$, that is, the "enthalpy efficiency" and, thus, the recovery of heat, approaches 0.

On the other hand, if the cold water flow $Q_k$ approaches values which are too high for the situation in question with respect to the properties of the particular heat exchanger, the temperature $T_2$, as well as the temperature $T_3$, approaches the inlet temperature $T_1$ of the cold water and $n_T$ approaches 0 and $n_e$ approaches 1. This implies that the "recovery" approaches one and, at the same time, the temperature increase of the cold water approaches 0, thereby implying a maximum increase of entropy.

An optimal utilization of the heat exchanger for an actual purpose obviously implies that the temperature efficiency $\eta_T$, as well as the enthalpy efficiency $\eta_e$, have values different than 0. Nevertheless, these two efficiencies are interrelated such that their quotient is given by:

$$\frac{\eta_e}{\eta_T} = \frac{T_4 - T_3}{T_2 - T_1} \quad (4)$$

This expression corresponds to a progression of the relationship $n_e/n_T$, and this progression is for the extreme limiting values 0 and 1 of $\eta_e$ and 1 and 0 of $\eta_T$, therefore, the progression varies continuously from 0 to infinity and, consequently, contains the above-described value $\tau_s$. Note that $\tau_s$ is the parameter that according to the present invention, as described above, is to be maintained at a predetermined desired value in order to obtain maximum utilization of the heat exchanger in an actual physical implementation.

Presuming that in the graphical representation of FIG. 2 the continuous or unbroken lines represent the situation in which a condition for optimal exchange in the heat exchanger is present thus, $\tau_s = (T_4 - T_3)/(T_2 - T_1)$. Note that the relationship between the flow of heat between the donating fluid and the accepting fluid, and neglecting external losses, is always given by:

$$Q_k(T_2 - T_1) = Q_w(T_4 - T_3) \rightarrow \frac{Q_k}{Q_w} \cdot \frac{T_4 - T_3}{T_2 - T_1} = \tau_s \quad (5)$$

Now, if the flow of the heat donating fluid is increased for whatever operational reasons, the flow of the heat accepting or receiving fluid should be correspondingly increased in order to maintain the predetermined optimal utilization for the specific conditions that are present. If the flow of the heat receiving fluid remains constant, however, and the flow of the heat donating fluid increases, then the exit temperature of the two fluid flows will change accordingly, as given by:

$$Q_k(T_{2i} - T_1) = (Q_w + \Delta Q_w)(T_4 - T_{3i}) \rightarrow \quad (6)$$

$$\frac{Q_k}{Q_w + \Delta Q_w} \cdot \frac{T_4 - T_{3i}}{T_{2i} - T_1} = \tau_i$$

in which $\Delta Q_w$ represents the change of flow of the heat donating fluid $T_{3i}$ and $T_{2i}$ are the exit temperatures then in existence, respectively. While it is true that the heat recovery will increase, the temperature change relationship will deviate with $\tau_i/\tau_s = Q_w/(Q_w + \Delta Q_w)$ from that which is required for the optimal operation of the system. This situation is represented in FIG. 2 by the dashed or broken lines between the temperature levels $T_4$ and $T_{3i}$ and temperature levels $T_1$ and $T_{2i}$, respectively. In accordance with the present invention, the flow of the heat receiving fluid is controlled so that the temperature relationship $\tau_i$ will agree with the predetermined value $\tau_s$, this relationship is illustrated by the dot-and-dash or chain lines in FIG. 2 and which will be present with the flow quantities corresponding to the relationship $\tau_s = (Q_w + \Delta Q_w)/(Q_k + \Delta Q_k)$, where $\Delta Q_k$ is the increase in the flow rate of the heat receiving fluid achieved by directly controlling that fluid flow.

Accordingly, following the teachings of the present invention, it is possible to control either of the fluid flows by the other in such a manner that $\tau_s$ is maintained at a constant. As primary control signals the actual sensed values $T_{1i}$, $T_{2i}$, $T_{3i}$, and $T_{4i}$ of the four temperatures in questions are utilized. In these primary control signals, the signals representing $T_{3i}$ and $T_{4i}$ are fed to a differential unit, which generates a signal representing the temperature difference $(T_{4i} - T_{3i})$ and, similarly, the signals representing temperatures $T_{1i}$ and $T_{2i}$ are fed to a second differential unit, which generates a signal representing the temperature difference $(T_{2i} - T_{1i})$. The output signals from these two differential units are applied as input signals to a divider, one of which is the dividend and the other of which is the diviseor. The output signal other divider representing the quotient $(T_{4i} - T_{3i})/(T_{2i} - T_{1i})$, and this quotient output signal is then fed as an input signal representing the actual value $\tau_i$ to a comparator in which it is compared with the predetermined desired temperature quotient $\tau_s$. The comparator output signal then represents a controlled variable signal that may be utilized to control either the first or second fluid flows, $Q_w$ or $Q_k$, by the other while simultaneously maintaining the predetermined parameter of interest for the heat exchanger.

It should be pointed out that it is obviously inessential when comparing in the comparing unit whether the temperature difference quotient $\tau_s$ and $\tau_i$, or the reciprocal values thereof, are utilized for the flow control. Note that no knowledge or information whatsoever is required of the intensities of the flow of the two fluids, in order to control the flows such that the quotient between them is maintained constant and the value corresponding to a predetermined optimal utilization of the heat exchanger obtained. All that is required, according to the present invention, is the selectively changing of the signal applied to the comparing unit in which it is compared with a predetermined desired value in order to obtain optimal utilization of the heat exchanger.

Figure 3:
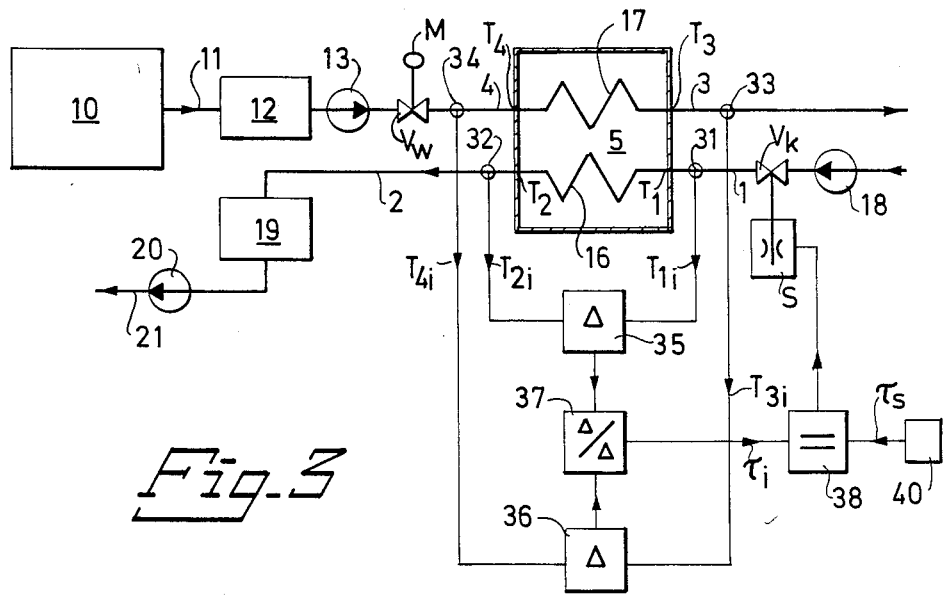
FIG. 3 schematically represents a heat exchanger and control system according to the present invention.

FIG. 3 represents an embodiment of an entire heat exchange system, such as a chemical plant or the like, in which elements identical to those described in relation to FIG. 1 have the same reference numerals. Thus, heat exchanger 5 has flowing therein heated water, such as industrial waste water or the like, and also cold water that is intended to extract the heat from the heated water for utilization elsewhere. Heat exchanger 5 has inlet 4 to receive the hot water that flows through channel 17 in the heat exchanger and exits at outlet 3 and during such flow donates heat to the cold water entering inlet 1 of heat exchanger 5 that flows through channel 16 and leaves heat exchanger 5 at outlet 2.

In the embodiment of FIG. 3, element 10 represents an industrial process from which heated waste water flows out at varying rates or quantities and with varying temperatures through waste water duct 11. For equalization purposes the water flows in duct 11 to a buffer tank 12, which may be employed to equalize heavy variations of the waste water flow or to provide for the possibility to operate the heat exchanger in a manner that the heat transport from the hot waste water to the cold fresh water in the heat exchanger can proceed substantially independently of variations in the outflow of waste water from the process equipment 10 of the plant.

From buffer tank 12 the hot waste water is brought by pump 13 through value $V_w$ and through channel 17 of heat exchanger 5 to outlet 3 for this cooled-down waste water, where it may be sent further to either a waste receptacle or for purification and possible re-use. Valve $V_w$ is a demand-controlled value that is set for a particular constant or quasiconstant waste water flow through the heat exchanger. As will be seen hereinafter, the flow of fresh water to be heated in the heat exchanger is controlled by the present invention without the necessity to measure the flow rate of either of the two fluids, and this is readily seen by noting that there is no flow meter in the heated waste water line through the heat exchanger.

The fresh water to be heated is admitted to fresh water channel 16 of heat exchanger 5 at inlet 1 and exits the heat exchanger 5 at outlet 2. A buffer tank 19 may be provided for the heated fresh water from which it may be conveyed to the ultimate user by pump 20 through duct 21. Obviously, the need for the buffer tank 19 for the heated fresh water may not be present in the situation where the demand of the plant or user for hot fresh water is always above the quantity of hot fresh water that is obtainable from the heat exchanger, when controlled according to the present invention.

In the embodiment of FIG. 3, control valve $V_k$ is arranged in the fresh water inlet duct to control the fresh water flow through the heat exchanger, following the teaching of the present invention. To obtain control of valve $V_k$, water temperature sensors 31 and 32 are arranged in cold water channel 16 of the heat exchanger 5 and temperature sensors 33 and 34 are arranged in the heated waste water channel 17 of heat exchanger 5. Temperature sensor 31 is arranged in fresh water inlet 1 and temperature sensor 32 is arranged in fresh water outlet 2 and the signals therefrom are fed to inputs of a first differentiating unit 35 and represent the actual output values $T_{2i}$ and $T_{1i}$, respectively. Differentiating unit 35 produces an output signal representing the difference between the two input temperatures that is fed to a divider or quotient unit 37. Similarly, temperature sensor 33 is arranged in the outlet line 3 of the heated waste water and temperature sensor 34 is arranged at the inlet line 4 of the heated waste water and corresponding electrical signals therefrom are connected to inputs of a second differentiating unit 36. The output of the second differentiating unit is connected to a second input of the quotient or divider unit 37. The output signal of divider unit 37 represents the quotient $(T_{4i}-T_{3i})/(T_{2i}-T_{1i})$, which is the actual value $\tau_i$ and this output signal is connected to one input of comparator 38. The other input of comparator 38 is derived from an adjustable signal generator 40 and this signal represents the desired value $\tau_s$ to obtain optimum operation of the system.

Thus, in a manner well known in connecting with servo systems, comparator 38 generates an actuating error signal, for example, by differentiating, useful to control a servo system S that operates the setting of valve $V_k$. Thus, it is seen that the servo system S operates in dependence on a present actuating error signal and adjusts the valve position $V_k$ so that parameter $\tau_s$ is maintained at a constant, in accordance with a quastistationary waste water flow, symbolized by a manual control wheel M in valve $V_w$, without the necessity for actually measuring either one of the actual flows of the two fluids.

In the case where the operational conditions are such that it might be more convenient or advantageous to control the fresh water flow in a quasistationary or stationary fashion in dependence on variable demand, valve $V_w$ may instead be controlled by a servo system in an analogous fashion to the control of valve $V_k$, as shown in FIG. 3, in order to maintain the temperature relations $\tau_s$ constant.

Although illustrated embodiments of the present invention have been described herein with reference to the accompanying drawings, it is to be understood that the invention is not limited to those precise embodiments and that various changes and modifications may be effected therein by one skilled in the art without departing from the scope or spirit of the invention, as defined in the appended claims.

What is claimed is:

1. A method of controlling the flow of one of the two fluids passing through a heat exchanger in counter current when the flow of the other fluid varies, comprising the steps of:
   measuring the temperatures $T_{1i}$, $T_{2i}$, $T_{3i}$ and $T_{4i}$, where $T_{1i}$ is the inlet temperature and $T_{2i}$ is the outlet temperature of said one fluid; and $T_{3i}$ is the outlet temperature and $T_{4i}$ is the inlet temperature of said other fluid;
   forming the temperature relation $$\tau_i = \frac{T_{4i} - T_{3i}}{T_{2i} - T_{1i}};$$

comparing $\tau_i$ with a predetermined temperature relation which corresponds to a condition of optimum effectiveness of the heat exchanger for the actual operational situation; and controlling the fluid of said one flow in response to the result of said comparison in order to restore said predetermined temperature relation.

2. A device for controlling the flow of one of the two fluids passing through respective inlets and outlets of a heat exchanger in counter current, when the flow of the other of the two fluids varies, in order to maintain a condition of optimum effectiveness for the actual operational situation of the heat exchanger, comprising:

temperature sensors arranged in the inlet and the outlet of said one fluid flow and in the inlet and the outlet of said other fluid flow for generating control signals representative of the fluid temperatures at the respective inlets and outlets;

a first differential circuit for generating a first signal representative of the difference between the inlet temperature and the outlet temperature of said one fluid;

a second differential circuit for generating a second signal representative of the difference between the inlet temperature and outlet temperature of said other fluid;

a divider receiving as input signals the output signals of the first and second differential circuits and generating in response thereto an output signal representative of the ratio between its two input signals;

means for generating a signal representative of a predetermined, selected desired temperature relation of the heat exchanger;

a comparison unit for comparing the output signal of said divider and the output signal of said means generating said desired temperature relation and generating an output signal representative of a difference there between said signals; and a servo-controlled valve arranged in the flow path of said one fluid being controlled in dependence on the output signal from said comparison unit to set said valve for delivering a flow of said one fluid so that the output of the divider substantially equals said predetermined desired temperature relation.

3. A device according to claim 2, further comprising a buffer tank in a duct from a source of said other fluid to the heat exchanger, said tank being arranged for collecting heat donating fluid from said source and delivering said other fluid to the heat exchanger, whereby the fluid is transferred from the buffer tank to the heat exchanger with a flow deviating from the flow to the buffer tank from said source.

4. A device according to any one of claims 2 or 3, further by comprising a buffer tank arranged in a duct from the outlet of the said one fluid from the heat exchanger to a consumer, said tank making possible a flow of said one fluid to a consumer deviating from the flow of said fluid from the heat exchanger to the buffer tank.

* * * * *